(12) United States Patent
Abe et al.

(10) Patent No.: US 11,305,461 B2
(45) Date of Patent: Apr. 19, 2022

(54) SMALL PIECE SUPPLYING APPARATUS AND FIBROUS BODY MOLDING APPARATUS

(71) Applicant: SEIKO EPSON CORPORATION, Tokyo (JP)

(72) Inventors: Takashi Abe, Yamagata (JP); Makoto Sato, Nagano (JP); Koji Motohashi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 99 days.

(21) Appl. No.: 17/005,523

(22) Filed: Aug. 28, 2020

(65) Prior Publication Data

US 2021/0060820 A1  Mar. 4, 2021

(30) Foreign Application Priority Data

Aug. 30, 2019 (JP) .............................. JP2019-158893

(51) Int. Cl.
| | | |
|---|---|---|
| *B29B 15/00* | (2006.01) | |
| *B29C 70/00* | (2006.01) | |
| *B29B 15/08* | (2006.01) | |
| *B29C 70/30* | (2006.01) | |
| *B29K 201/00* | (2006.01) | |

(52) U.S. Cl.
CPC .............. *B29B 15/08* (2013.01); *B29C 70/30* (2013.01); *B29K 2201/00* (2013.01)

(58) Field of Classification Search
CPC ......... B29B 15/00; B29B 15/08; B29C 70/00; B29C 70/30
See application file for complete search history.

(56) References Cited

FOREIGN PATENT DOCUMENTS

| | | |
|---|---|---|
| JP | 2009-032321 A | 2/2009 |
| JP | 2011-157657 A | 8/2011 |
| JP | 2014-134209 A | 7/2014 |
| JP | 2018-150666 A | 9/2018 |

*Primary Examiner* — Jacob T Minskey
*Assistant Examiner* — Matthew Hoover
(74) *Attorney, Agent, or Firm* — Global IP Counselors, LLP

(57) ABSTRACT

A small piece supplying apparatus includes: a raw material supplying section that supplies a raw material sheet; a coarse crushing section that coarsely crushes the raw material sheet supplied from the raw material supplying section to produce small pieces; and a reservoir section in which the small pieces produced by the coarse crushing section are accumulated. The raw material supplying section includes a feeder roller that feeds out the raw material sheet, and a contact section that changes a course of the raw material sheet by contact with an edge of the raw material sheet fed out by the feeder roller.

11 Claims, 7 Drawing Sheets

SMALL PIECE SUPPLYING APPARATUS AND FIBROUS BODY MOLDING APPARATUS

The present application is based on, and claims priority from JP Application Serial Number 2019-158893, filed Aug. 30, 2019, the disclosure of which is hereby incorporated by reference herein in its entirety.

BACKGROUND

1. Technical Field

Embodiments of the present disclosure relate to a small piece supplying apparatus and a fibrous body molding apparatus.

2. Related Art

A small piece supplying apparatus of related art includes a transportation roll pair that transports a sheet and a cutter blade that coarsely crushes, that is, shreds, the sheet transported by the transportation roll pair, for example, as disclosed in JP-A-2009-032321. The transportation roll pair is made up of two rotation rollers facing with each other in a thickness direction of the sheet that is transported. By rotation of each rotation roller, it is possible to feed the sheet to the cutter blade while nipping the sheet therebetween.

In a structure of transporting a sheet while nipping the sheet between two rotation rollers as disclosed in JP-A-2009-032321, it is possible to adjust the rotation direction and the rotation speed of each rotation roller. Therefore, even if two sheets are supplied to the two rotation rollers in a double-fed state, setting the rotation direction and the rotation speed of one of the two rotation rollers different from the rotation direction and the rotation speed of the other roller makes it possible to separate the one sheet from the other sheet and transport the separated sheets because the two sheets become shifted from each other in the transportation direction. This sheet separation method is called as a retard method.

However, in the retard method, excessive sheet deformation might occur due to the difference between the rotation directions and the rotation speeds of the two rollers, for example, if the sheet that is transported is bent or if a plurality of sheets bound at a part with a staple or the like is transported. For example, the sheet sometimes becomes bent in the middle or deforms into an accordion-folded shape. In this case, a so-called jam, which is a trouble of a sheet getting jammed between the rotation rollers, occurs. This causes a sheet transportation failure or stopping. Therefore, it might become impossible to produce and supply a constant amount of small pieces stably due to a failure to feed sheets to the cutter blade stably.

SUMMARY

Some aspects of the present disclosure can be implemented as follows.

A small piece supplying apparatus according to a certain aspect of the present disclosure includes: a raw material supplying section that supplies a raw material sheet; a coarse crushing section that coarsely crushes the raw material sheet supplied from the raw material supplying section to produce small pieces; and a reservoir section in which the small pieces produced by the coarse crushing section are accumulated. The raw material supplying section includes a feeder roller that feeds out the raw material sheet, and a contact section that changes a course of the raw material sheet by contact with an edge of the raw material sheet fed out by the feeder roller.

A fibrous body molding apparatus according to a certain aspect of the present disclosure includes: the small piece supplying apparatus according to a certain aspect of the present disclosure; a defibrating section that defibrates the small pieces supplied by the small piece supplying apparatus; a deposition section on which a defibrated material produced by the defibrating section is deposited; and a molding section that molds a deposited material produced on the deposition section.

DESCRIPTION OF EXEMPLARY EMBODIMENTS

Based on a certain non-limiting advantageous embodiment illustrated in the accompanying drawings, a small piece supplying apparatus and a fibrous body molding apparatus according to the present disclosure will now be explained in detail.

EXEMPLARY EMBODIMENT

Figure 1:
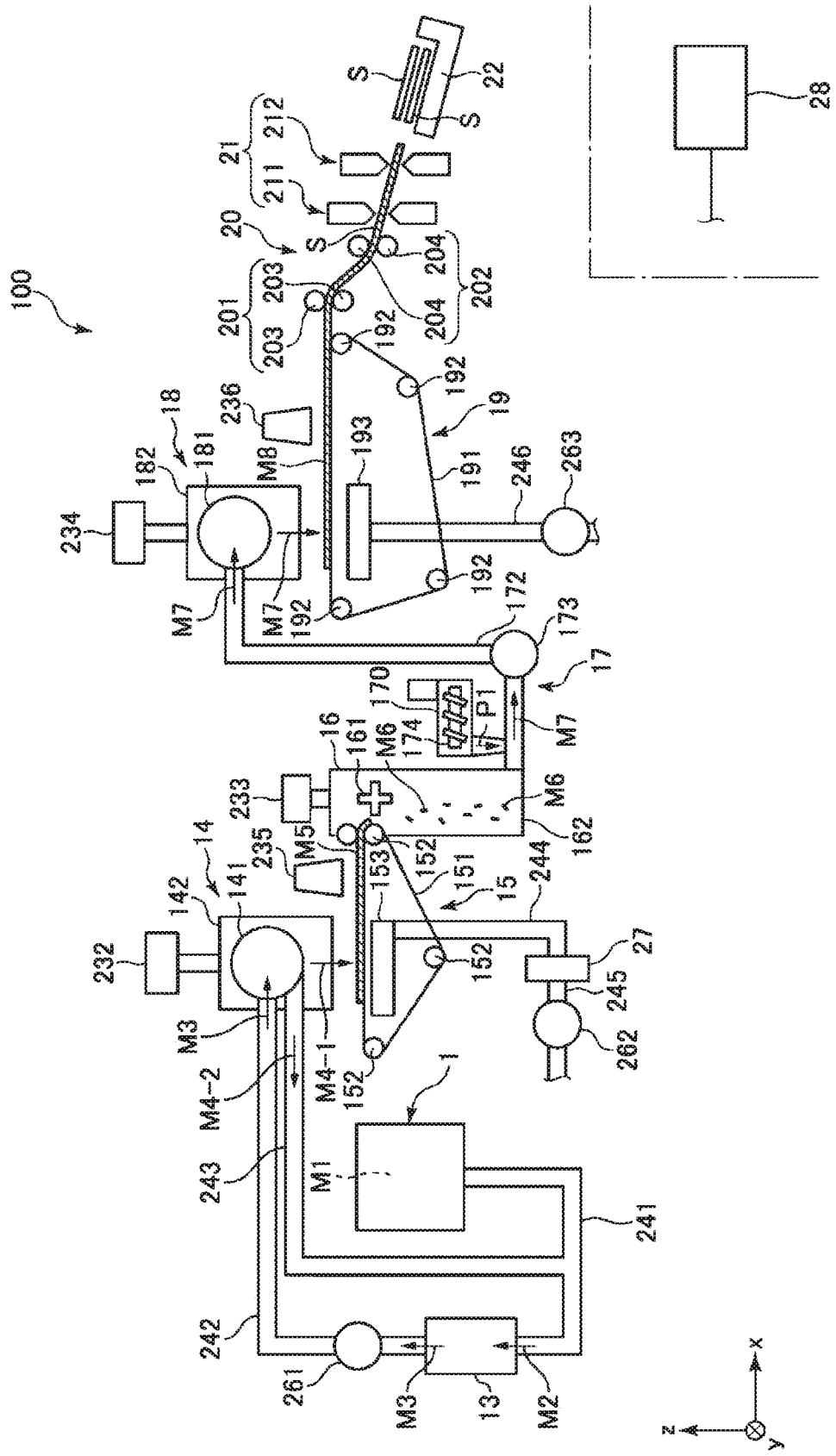
FIG. 1 is a schematic side view of a fibrous body molding apparatus according to an exemplary embodiment.
Figure 2:
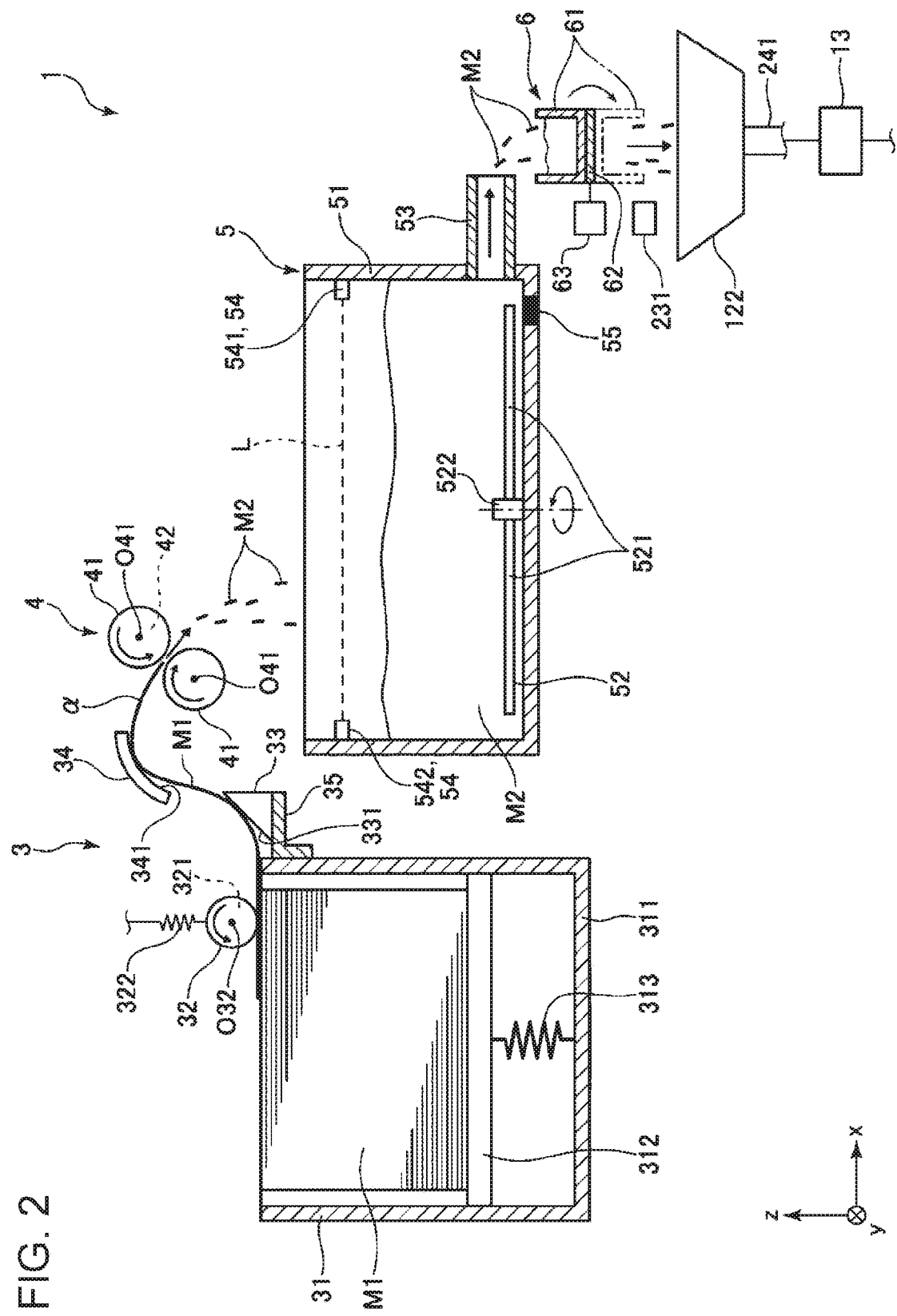
FIG. 2 is a schematic structure diagram of a small piece supplying apparatus illustrated in FIG. 1.
Figure 3:
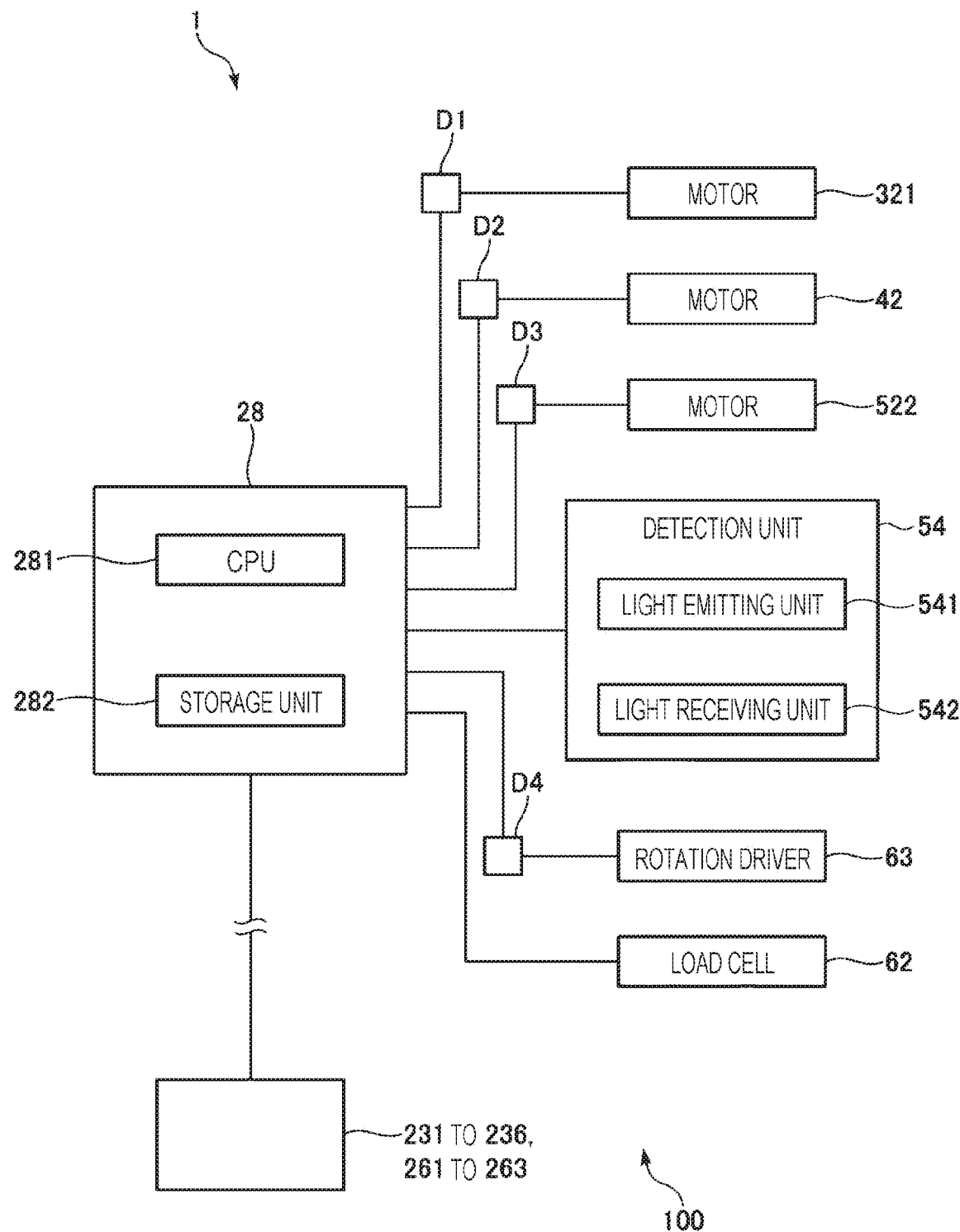
FIG. 3 is a block diagram of the small piece supplying apparatus illustrated in FIG. 1.
Figure 4:
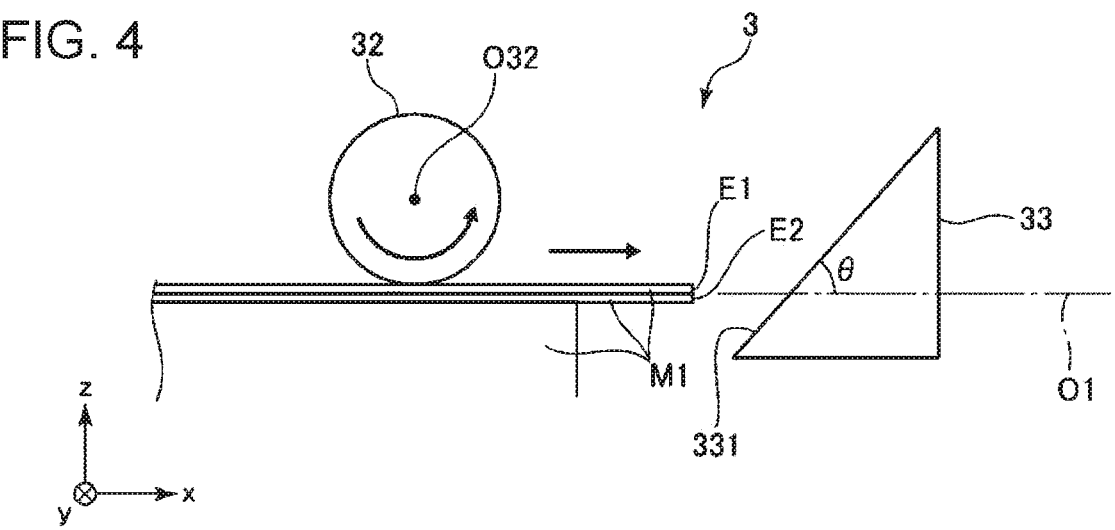
FIG. 4 is a partial enlarged view of a raw material supplying unit illustrated in FIG. 2, for explaining that raw material sheets are fed such that one sheet is on the other sheet.
Figure 5:
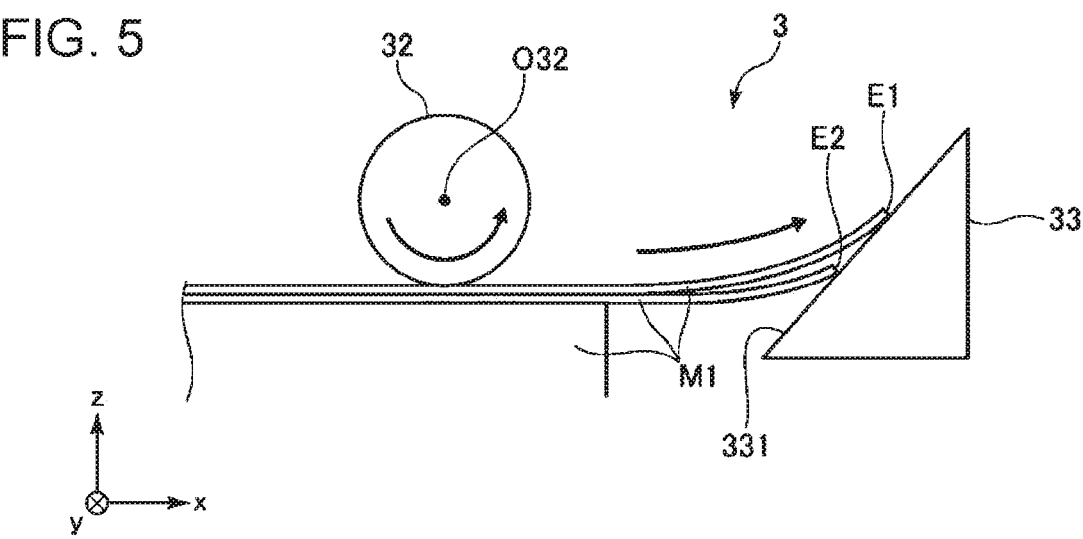
FIG. 5 is a partial enlarged view of a raw material supplying unit illustrated in FIG. 2, for explaining that raw material sheets are fed such that one sheet is on the other sheet.
Figure 6:
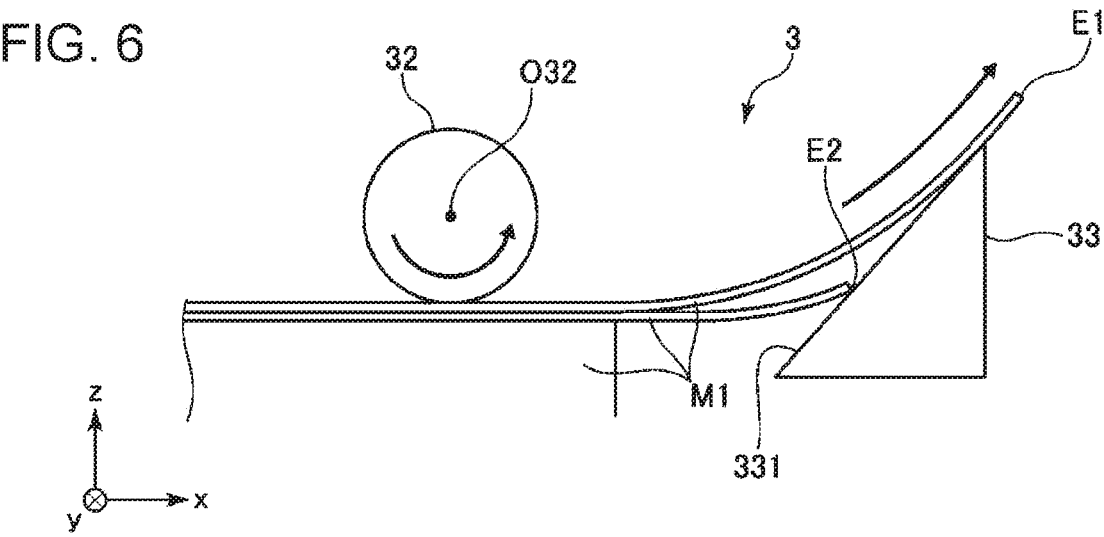
FIG. 6 is a partial enlarged view of a raw material supplying unit illustrated in FIG. 2, for explaining that raw material sheets are fed such that one sheet is on the other sheet.
Figure 7:
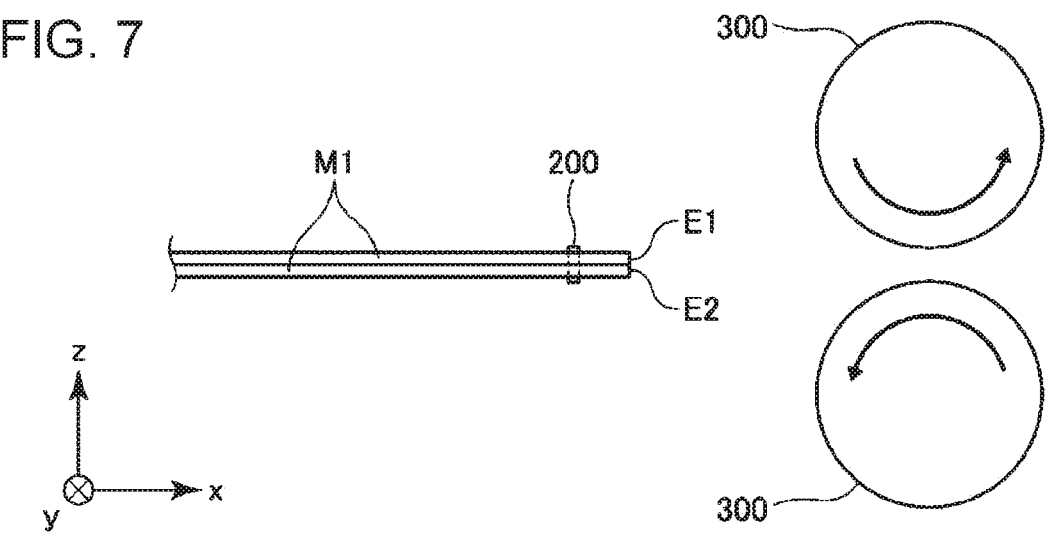
FIG. 7 is a diagram for explaining a state in which raw material sheets are fed using a retard method.
Figure 8:
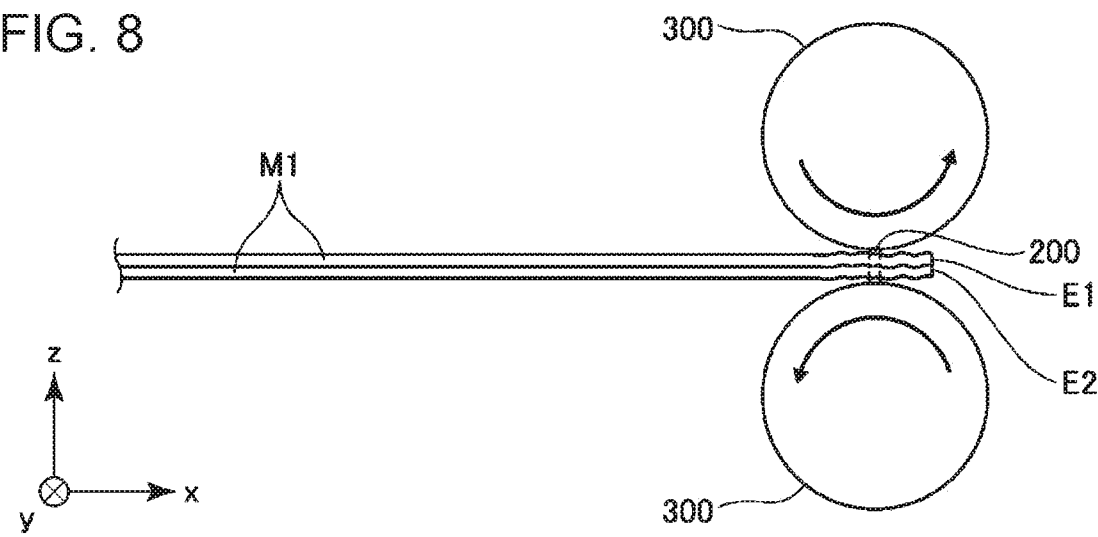
FIG. 8 is a diagram for explaining a state in which raw material sheets are fed using a retard method.
Figure 9:
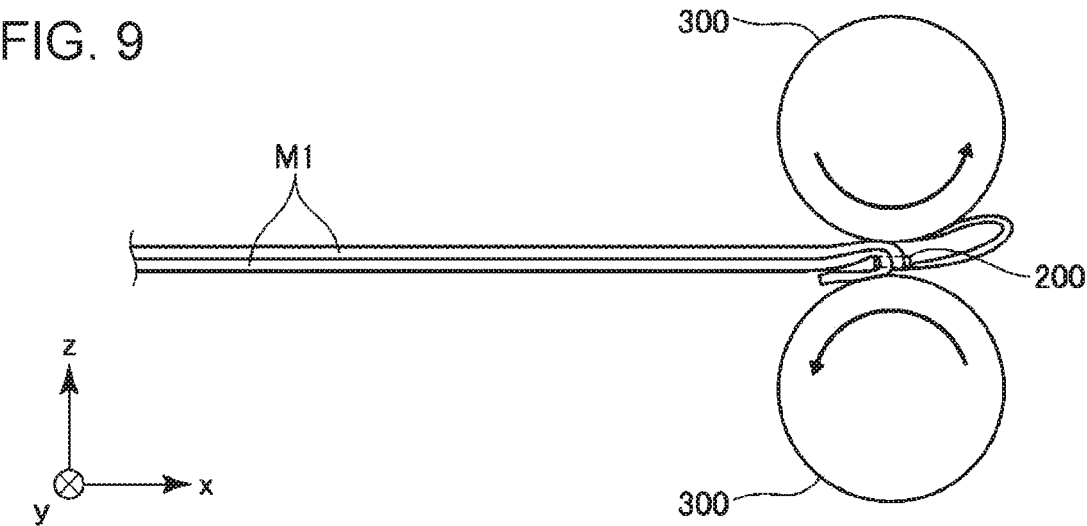
FIG. 9 is a diagram for explaining a state in which raw material sheets are fed using a retard method.
Figure 10:
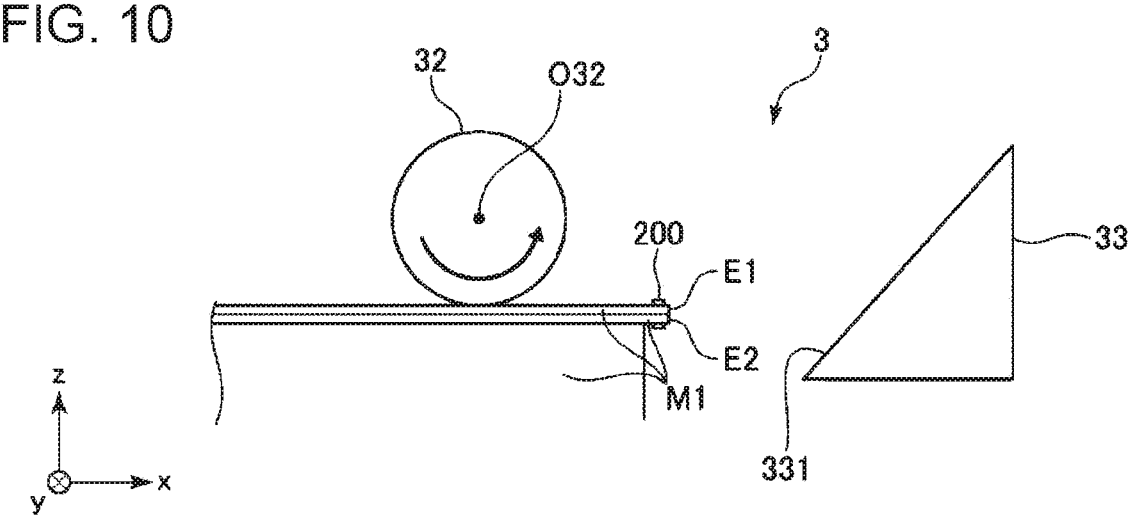
FIG. 10 is a partial enlarged view of the raw material supplying unit illustrated in FIG. 2, for explaining that raw material sheets bound with a staple are fed.
Figure 11:
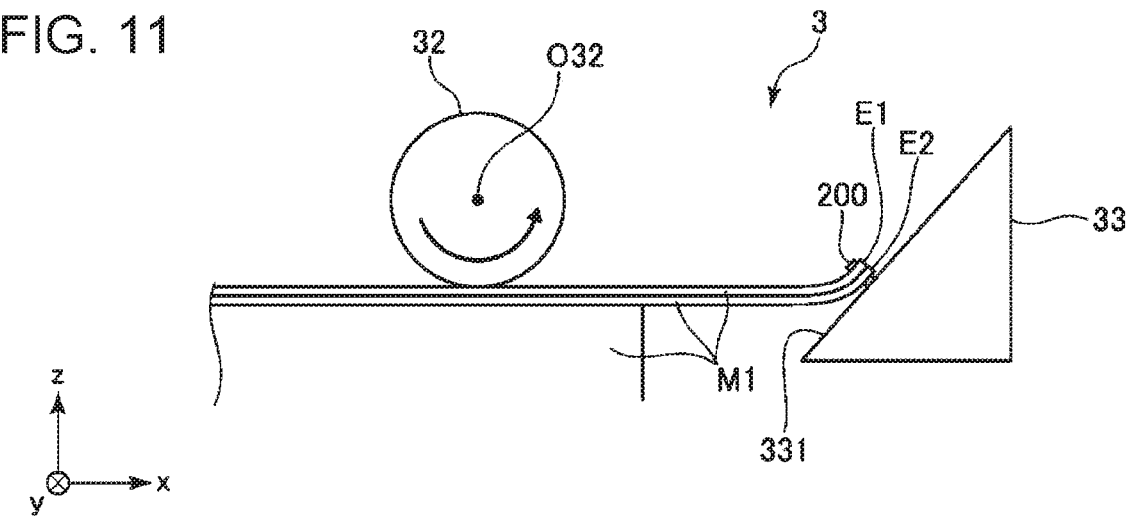
FIG. 11 is a partial enlarged view of the raw material supplying unit illustrated in FIG. 2, for explaining that raw material sheets bound with a staple are fed.
Figure 12:
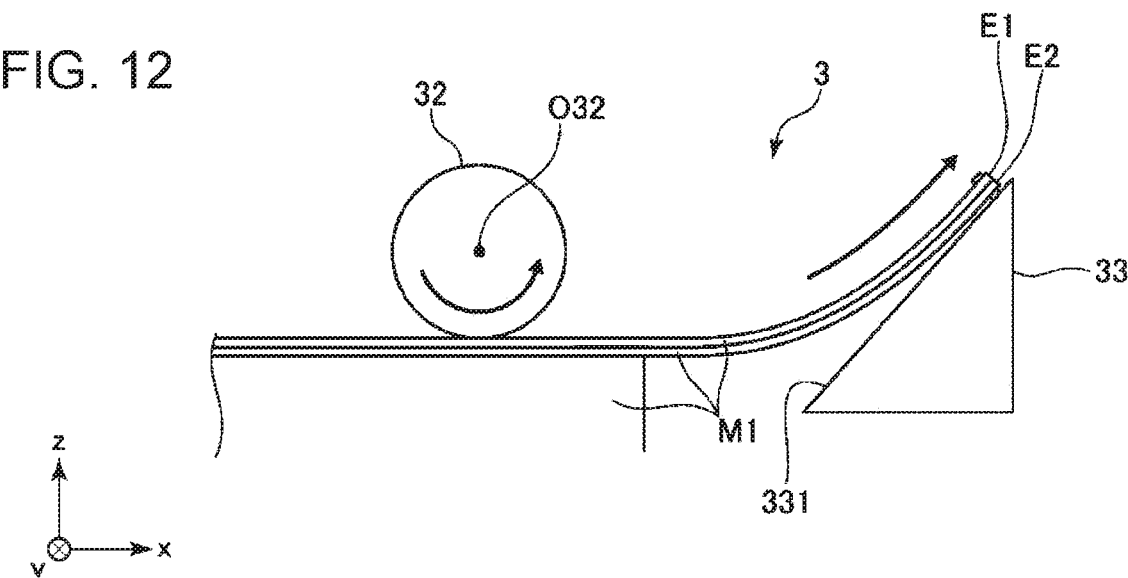
FIG. 12 is a partial enlarged view of the raw material supplying unit illustrated in FIG. 2, for explaining that raw material sheets bound with a staple are fed.
Figure 13:
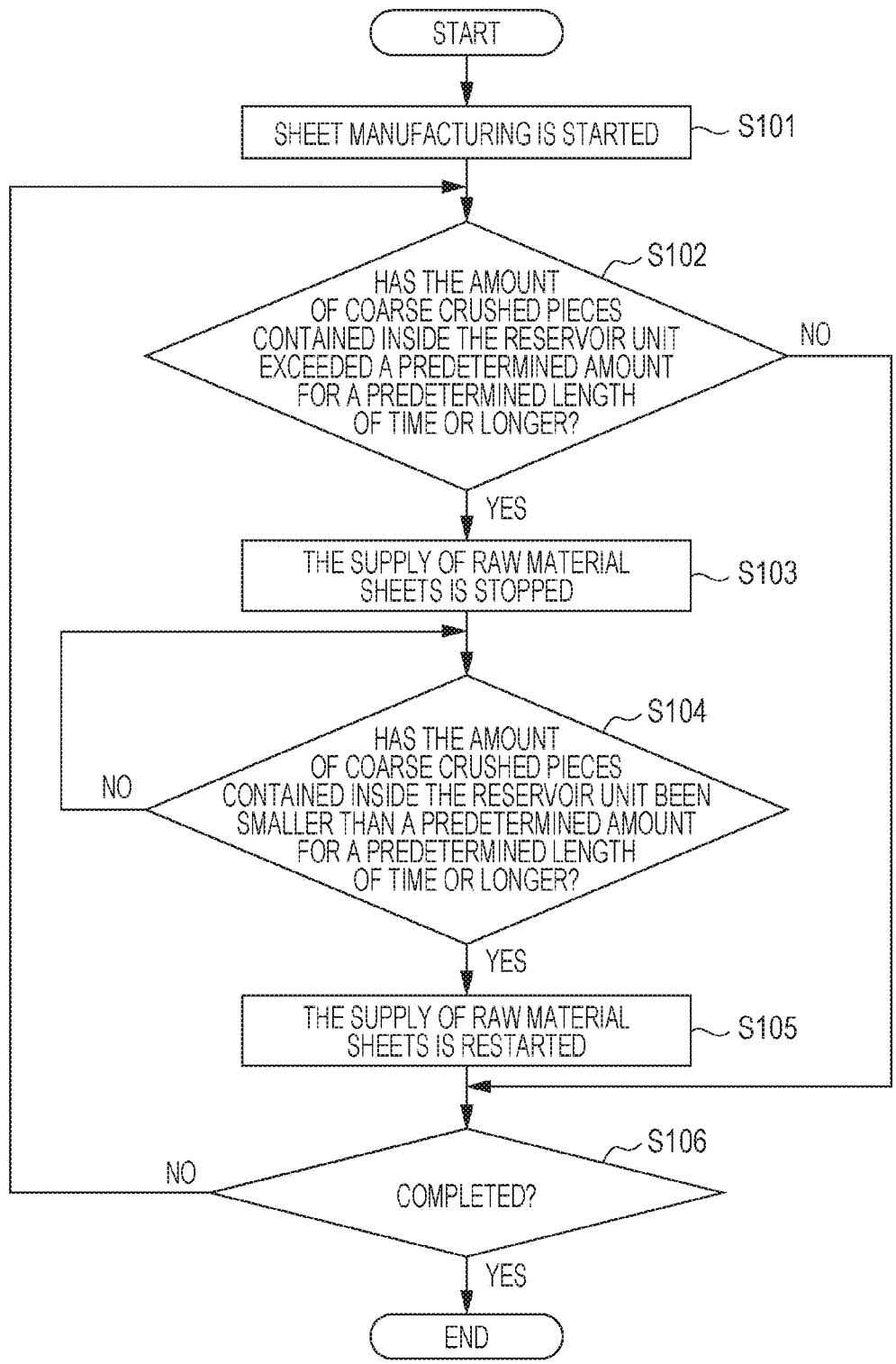
FIG. 13 is a flowchart for explaining the control operation of a control unit illustrated in FIG. 3.

FIG. 1 is a schematic side view of a fibrous body molding apparatus according to an exemplary embodiment. FIG. 2 is a schematic structure diagram of a small piece supplying apparatus illustrated in FIG. 1. FIG. 3 is a block diagram of the small piece supplying apparatus illustrated in FIG. 1. Each of FIGS. 4 to 6 is a partial enlarged view of a raw material supplying unit illustrated in FIG. 2, for explaining that raw material sheets are fed such that one sheet is on the other sheet. Each of FIGS. 7 to 9 is a diagram for explaining a state in which raw material sheets are fed using a retard method. Each of FIGS. 10 to 12 is a partial enlarged view of the raw material supplying unit illustrated in FIG. 2, for explaining that raw material sheets bound with a staple are fed. FIG. 13 is a flowchart for explaining the control operation of a control unit illustrated in FIG. 3.

In the description below, in order to facilitate an explanation, three axes orthogonal to one another will be referred to as the x axis, the y axis, and the z axis as shown in FIGS. 1, 2, and 4 to 12. The x-y plane including the x axis and the y axis is horizontal. The z axis is vertical. The direction indicated by the head of an arrow on each axis is denoted as "+". The opposite direction is denoted as "−". An upper position in FIGS. 1, 2, 4 to 12 may be referred to as "above/over" or "upper", and a lower position therein may be referred to as "below/under" or "lower".

A fibrous body molding apparatus 100 illustrated in FIG. 1 is an apparatus that outputs a molded body by coarsely crushing a raw material sheet M1, performing defibration, mixing a binding material therewith, performing deposition, and thereafter molding a deposited material. An example of the material of the raw material sheet M1 is a sheet-like material made of a fiber-containing body containing a cellulose fiber. The cellulose fiber may be any fibrous material containing cellulose as a main compound, and may contain hemicellulose or lignin in addition to cellulose. The form of the raw material sheet M1 is not limited, such as woven fabric or non-woven fabric. The raw material sheet M1 may be, for example, recycled paper reproduced by defibrating used paper or synthetic YUPO paper (registered trademark), or may be non-recycled paper.

The molded body manufactured by the fibrous body molding apparatus 100 may have a shape like a sheet as in recycled paper, or a shape like a block. The density of the molded body is also not limited. The molded body may have comparatively high fiber density as in a sheet. The molded body may have comparatively low fiber density as in a sponge. The molded body may have mixed characteristics of them.

In the description below, it is assumed that the raw material sheet M1 is waste paper that has been used or is no longer needed, and it is assumed that the molded body manufactured is a sheet S that is recycled paper.

The fibrous body molding apparatus 100 illustrated in FIG. 1 includes a small piece supplying apparatus 1 according to the present disclosure, a defibrating unit 13, a screening unit 14, a first web forming unit 15, a fragmenting unit 16, a mixing unit 17, a disentangling unit 18, a second web forming unit 19, which is an example of a deposition section, a molding unit 20, a cutting unit 21, a stock unit 22, a collection unit 27, and a control unit 28, which controls the operation of these units.

The fibrous body molding apparatus 100 further includes a humidifying unit 231, a humidifying unit 232, a humidifying unit 233, a humidifying unit 234, a humidifying unit 235, and a humidifying unit 236. In addition to those described above, the fibrous body molding apparatus 100 includes a blower 261, a blower 262, and a blower 263.

As illustrated in FIG. 3, the humidifying units 231 to 236 and the blowers 261 to 263 are electrically coupled to the control unit 28. The operations of the humidifying units 231 to 236 and the blowers 261 to 263 are controlled by the control unit 28. That is, in the present embodiment, the operation of each unit of the fibrous body molding apparatus 100 is controlled by a single control unit 28. However, the scope of the present disclosure is not limited to this example. For example, a control unit that controls the operation of each unit of the small piece supplying apparatus 1 and a control unit that controls the operation of units other than those of the small piece supplying apparatus 1 may be provided separately from each other.

In the fibrous body molding apparatus 100, a raw material supplying process, a coarse crushing process, a weighing process, a defibrating process, a screening process, a first web forming process, a fragmenting process, a mixing process, a disentangling process, a second web forming process, a sheet forming process, and a cutting process are performed in this order. Among these processes, the small piece supplying apparatus 1 is in charge of the raw material supplying process, the coarse crushing process, and the weighing process.

The small piece supplying apparatus 1 includes a raw material supplying unit 3, a coarse crushing unit 4, a reservoir unit 5, and a weighing unit 6. The raw material sheet M1 supplied by the raw material supplying unit 3 is coarsely crushed by the coarse crushing unit 4, which is, for example, a shredder. As a result, coarse crushed pieces M2 as an example of small pieces, that is, shredded pieces, are produced. Next, the coarse crushed pieces M2 are temporarily accumulated in the reservoir unit 5 and weighed by the weighing unit 6, and a predetermined amount of the coarse crushed pieces M2 is supplied intermittently downstream, that is, to the defibrating unit 13. Each unit of the small piece supplying apparatus 1 will be described in detail later.

The defibrating unit 13 is a section that performs a defibrating process of defibrating the coarse crushed pieces M2 in air, which means dry defibration. It is possible to produce a defibrated material M3 from the coarse crushed pieces M2 through the defibrating process performed by the defibrating unit 13. The term "defibration" means the disentanglement of the coarse crushed pieces M2 made of plural fibers bonded to one another into individual fibers. The result of the disentanglement is the defibrated material M3. The defibrated material M3 has a string shape or a ribbon shape. The defibrated material M3 may be in a state of so-called "lumps", in which defibrated fibers are intertwined with one another in an agglomerated manner.

The defibrating unit 13 is, for example, in the present embodiment, an impeller mill that includes rotary blades that rotate at a high speed and a liner that is located in the outer circumference of the rotary blades. The coarse crushed pieces M2 that have flowed into the defibrating unit 13 go into the gap between the rotary blades and the liner and are defibrated.

By rotation of the rotary blades, the defibrating unit 13 is able to produce the flow of air, that is, airflow from the coarse crushing unit 4 toward the screening unit 14. By this means, it is possible to suck the coarse crushed pieces M2 into the defibrating unit 13 through a pipe 241. After the defibration, it is possible to send the defibrated material M3 to the screening unit 14 through a pipe 242.

The blower 261 is provided between the ends of the pipe 242. The blower 261 is an airflow generator that generates airflow toward the screening unit 14. This promotes the delivery of the defibrated material M3 to the screening unit 14.

The screening unit 14 is a section that performs a screening process of screening the defibrated material M3 according to the lengths of fibers. In the screening unit 14, the defibrated material M3 is sorted into a first screened material M4-1 and a second screened material M4-2, which is larger than the first screened material M4-1. The first screened material M4-1 has a size suitable for the subsequent manufacture of a sheet S. The average length may be 1 μm or more and 30 μm or less. The second screened material M4-2 contains, for example, insufficiently defibrated fibers, excessive agglomeration of defibrated fibers, and the like.

The screening unit 14 has a drum portion 141 and a housing portion 142, which houses the drum portion 141.

The drum portion 141 is a sieve that is has a cylindrical net structure and rotates around its central axis. The defibrated material M3 flows into the drum portion 141. By rotation of the drum portion 141, the defibrated material M3 that is smaller than the mesh of the net is sorted as the first screened material M4-1, and the defibrated material M3 that is larger than the mesh of the net is sorted as the second screened material M4-2. The first screened material M4-1 falls from the drum portion 141.

On the other hand, the second screened material M4-2 is sent to a pipe 243 connected to the drum portion 141. The pipe 243 is connected to the pipe 241 at its end that is the opposite of an end connected to the drum portion 141, that is, at the downstream end. The second screened material M4-2 that has flowed through the pipe 243 merges with the coarse crushed pieces M2 inside the pipe 241 and flows together with the coarse crushed pieces M2 into the defibrating unit 13. By this means, the second screened material M4-2 is returned to the defibrating unit 13 and is subjected to defibration again together with the coarse crushed pieces M2.

The first screened material M4-1 falls from the drum portion 141 while being dispersed in air and travels toward the first web forming unit 15, which is located under the drum portion 141. The first web forming unit 15 is a section that performs a first web forming process of forming a first web M5 from the first screened material M4-1. The first web forming unit 15 includes a mesh belt 151, three stretching rollers 152, and a suction unit 153.

The mesh belt 151 is an endless belt, and the first screened material M4-1 is deposited thereon. The mesh belt 151 is stretched around the three stretching rollers 152. The first screened material M4-1 on the mesh belt 151 is transported downstream by the rotation of the stretching rollers 152.

The first screened material M4-1 has a size larger than the mesh of the mesh belt 151. Therefore, the first screened material M4-1 is unable to pass through the mesh belt 151. This ensures deposition on the mesh belt 151. The first screened material M4-1 is deposited on the mesh belt 151 and is transported downstream together with the mesh belt 151. Therefore, the first web M5 that has a layer shape is formed.

There is a possibility that the first screened material M4-1 contains, for example, dust or dirt particles. Dust and dirt particles come from, for example, coarse crushing or defibration. Dust and dirt particles are collected into the collection unit 27 described later.

The suction unit 153 is a suction mechanism that sucks air from below the mesh belt 151. By this means, it is possible to suck dust and dirt that has passed through the mesh belt 151, together with air.

The suction unit 153 is connected to the collection unit 27 via a pipe 244. The dust and dirt particles sucked by the suction unit 153 are collected into the collection unit 27.

The collection unit 27 is further connected to a pipe 245. The blower 262 is provided between the ends of the pipe 245. By the operation of the blower 262, a suction force can be generated in the suction unit 153. This promotes the forming of the first web M5 on the mesh belt 151. The first web M5 is one from which dust and dirt particles have been removed. Dust and dirt particles flow through the pipe 244 to reach the collection unit 27 by the operation of the blower 262.

The housing portion 142 is connected to the humidifying unit 232. The humidifying unit 232 is a vaporizing humidifier. Therefore, humidified air is supplied into the housing portion 142. The humidified air humidifies the first screened material M4-1. This prevents the static cling of the first screened material M4-1 to the inner wall of the housing portion 142.

The humidifying unit 235 is provided downstream of the screening unit 14. The humidifying unit 235 is an ultrasonic humidifier that sprays water. Since moisture is supplied to the first web M5, the moisture content of the first web M5 is adjusted. The moisture adjustment prevents the static cling of the first web M5 to the mesh belt 151. Therefore, the first web M5 comes off easily from the mesh belt 151 at a position where the mesh belt 151 is turned back by the stretching roller 152.

The fragmenting unit 16 is provided downstream of the humidifying unit 235. The fragmenting unit 16 is a section that performs a fragmenting process, in which the first web M5 that has come off from the mesh belt 151 is fragmented. The fragmenting unit 16 includes a propeller 161 that is rotatably supported and a housing portion 162 that houses the propeller 161. By rotating the propeller 161, it is possible to fragment the first web M5. The first web M5 is broken into fragments M6. The fragments M6 drop inside the housing portion 162.

The housing portion 162 is connected to the humidifying unit 233. The humidifying unit 233 is a vaporizing humidifier. Therefore, humidified air is supplied into the housing portion 162. The humidified air prevents the static cling of the fragments M6 to the propeller 161 or the inner wall of the housing portion 162.

The mixing unit 17 is provided downstream of the fragmenting unit 16. The mixing unit 17 is a section that performs a mixing process of mixing the fragments M6 with an additive. The mixing unit 17 includes an additive supplying portion 171, a pipe 172, and a blower 173.

The pipe 172, through which a mixture M7 of the fragments M6 and the additive flows, connects the housing portion 162 of the fragmenting unit 16 and a housing portion 182 of the disentangling unit 18.

The additive supplying portion 171 is connected between the ends of the pipe 172. The additive supplying portion 171 includes a housing portion 170 that contains an additive and a screw feeder 174 provided inside the housing portion 170. By rotation of the screw feeder 174, the additive contained inside the housing portion 170 is forced out of the housing portion 170 to be supplied into the pipe 172. The additive supplied into the pipe 172 is mixed with the fragments M6 to turn into the mixture M7.

Examples of the additive supplied from the additive supplying portion 171 are a binder for bonding fibers to one another, a colorant for coloring fibers, an aggregation inhibitor for inhibiting aggregation of fibers, a flame retardant for making fibers and the like difficult to burn, a paper strengthening agent for enhancing the strength of a sheet S, and a defibrated material. Any one of these kinds of the additive, or a combination of two or more, may be used. In the description below, as an example, a case where the additive is a resin P1 that serves as a binder will be explained. Since the additive contains a binder for bonding fibers to one another, it is possible to enhance the strength of a sheet S.

A resin that is in the form of powder or particles can be used as the resin P1. For example, a thermoplastic resin, a curable resin, or the like can be used as the resin P1. It will be advantageous to use a thermoplastic resin. Examples of the thermoplastic resin include an AS resin, an ABS resin, polyethylene, polypropylene, polyolefin such as an ethylene-vinyl acetate copolymer (EVA), modified polyolefin, an acrylic resin such as polymethyl methacrylate, polyvinyl chloride, polystyrene, polyester such as polyethylene terephthalate and polybutylene terephthalate, polyamide (nylon) such as nylon 6, nylon 46, nylon 66, nylon 610, nylon 612, nylon 11, nylon 12, nylon 6-12, and nylon 6-66, polyphenylene ether, polyacetal, polyether, polyphenylene oxide, polyetheretherketone, polycarbonate, polyphenylene sulfide, thermoplastic polyimide, polyetherimide, a liquid crystal polymer such as aromatic polyester, various thermoplastic elastomers such as a styrene-based thermoplastic elastomer, a polyolefin-based thermoplastic elastomer, a polyvinyl chloride-based thermoplastic elastomer, a polyurethane-based thermoplastic elastomer, a polyester-based thermoplastic elastomer, a polyamide-based thermoplastic elastomer, a polybutadiene-based thermoplastic elastomer, a trans polyisoprene-based thermoplastic elastomer, a fluoro rubber-based thermoplastic elastomer, and a chlorinated polyethylene-based thermoplastic elastomer, and the like. Any one selected from among those enumerated above, or a combination of two or more, may be used. Polyester or a composition containing the polyester may be used as the thermoplastic resin.

The blower 173 is provided downstream of the additive supplying portion 171 between the ends of the pipe 172. The mixing of the fragments M6 and the resin P1 is promoted by the action of the rotating portion such as blades of the blower 173. The blower 173 is able to generate airflow toward the disentangling unit 18. The airflow stirs the fragments M6 and the resin P1 inside the pipe 172. This makes it possible for the mixture M7 to flow into the disentangling unit 18 in a state in which the fragments M6 and the resin P1 are uniformly dispersed. The fragments M6 in the mixture M7 are disentangled in the process of flowing through the pipe 172, thereby turning into a finer fibrous form.

The disentangling unit 18 is a section that performs a disentangling process of disentangling fibers intertwined with one another in the mixture M7. The disentangling unit 18 has a drum portion 181 and a housing portion 182, which houses the drum portion 181.

The drum portion 181 is a sieve that is has a cylindrical net structure and rotates around its central axis. The mixture M7 flows into the drum portion 181. When the drum portion 181 rotates, in the mixture M7, fibers, etc. that are smaller than the mesh of the net are able to pass through the drum portion 181. In this process, the mixture M7 is disentangled.

The housing portion 182 is connected to the humidifying unit 234. The humidifying unit 234 is a vaporizing humidifier. Therefore, humidified air is supplied into the housing portion 182. The humidified air humidifies the inside of the housing portion 182. This prevents the static cling of the mixture M7 to the inner wall of the housing portion 182.

The mixture M7 disentangled in the drum portion 181 falls while being dispersed in air and travels toward the second web forming unit 19, which is located under the drum portion 181. The second web forming unit 19 is a section that performs a second web forming process of forming a second web M8 from the mixture M7. The second web forming unit 19 includes a mesh belt 191, stretching rollers 192, and a suction unit 193.

The mesh belt 191 is an endless belt, and the mixture M7 is deposited thereon. The mesh belt 191 is stretched around the four stretching rollers 192. The mixture M7 on the mesh belt 191 is transported downstream by the rotation of the stretching rollers 192.

The size of most of the mixture M7 on the mesh belt 191 is larger than the mesh of the mesh belt 191. Therefore, most of the mixture M7 is unable to pass through the mesh belt 191. This ensures deposition on the mesh belt 191. The mixture M7 is deposited on the mesh belt 191 and is transported downstream together with the mesh belt 191. Therefore, the second web M8 that has a layer shape is formed.

The suction unit 193 is a suction mechanism that sucks air from below the mesh belt 191. Therefore, it is possible to suck the mixture M7 onto the mesh belt 191, and the deposition of the mixture M7 on the mesh belt 191 is promoted.

A pipe 246 is connected to the suction unit 193. The blower 263 is provided between the ends of the pipe 246. By the operation of the blower 263, a suction force can be generated in the suction unit 193.

The humidifying unit 236 is provided downstream of the disentangling unit 18. The humidifying unit 236 is an ultrasonic humidifier, similarly to the humidifying unit 235. Since moisture is supplied to the second web M8, the moisture content of the second web M8 is adjusted. The moisture adjustment prevents the static cling of the second web M8 to the mesh belt 191. Therefore, the second web M8 comes off easily from the mesh belt 191 at a position where the mesh belt 191 is turned back by the stretching roller 192.

The total moisture content added to the humidifying units 231 to 236 may be, for example, 0.5 parts by mass or more and 20 parts by mass or less with respect to 100 parts by mass of the material before humidification.

The molding unit 20 is provided downstream of the second web forming unit 19. The molding unit 20 is a section that performs a sheet forming process of forming a sheet S from the second web M8. The molding unit 20 includes a pressing portion 201 and a heating portion 202.

The pressing portion 201 includes a pair of calendar rollers 203 and is able to press the second web M8 between the calendar rollers 203 without heating. This increases the density of the second web M8. For example, the degree of non-heated pressing may be a degree that does not cause the melting of the resin P1. The second web M8 after the pressing is transported to the heating portion 202. One of the pair of calendar rollers 203 is a drive roller that is driven by the operation of a motor that is not illustrated, and the other is a driven roller.

The heating portion 202 includes a pair of heating rollers 204. It is possible to apply pressure while heating the second web M8 between the heating rollers 204. The heating and pressing causes the melting of the resin P1 in the second web M8, and fibers are bonded together by the molten resin P1. The sheet S is formed in this way. The sheet S is transported to the cutting unit 21. One of the pair of heating rollers 204 is a drive roller that is driven by the operation of a motor that is not illustrated, and the other is a driven roller.

The cutting unit 21 is provided downstream of the molding unit 20. The cutting unit 21 is a section that performs a cutting process of cutting the sheet S. The cutting unit 21 includes a first cutter 211 and a second cutter 212.

The first cutter 211 cuts the sheet S in a direction that intersects with the transport direction of the sheet S, in particular, a direction that is orthogonal thereto.

The second cutter 212 cuts the sheet S in a direction parallel to the transport direction of the sheet S downstream of the first cutter 211. This cutting is to remove unnecessary edge portions at both ends of the sheet S, that is, the ends in the +y direction and the −y direction, to adjust the width of the sheet S properly. The cut and removed portion is called "waste edge".

A sheet S having a desired shape and size can be obtained by cutting with the first cutter 211 and the second cutter 212 described above. The sheet S is further transported downstream to be stored on the stock unit 22.

Each unit included in the fibrous body molding apparatus 100 described above is electrically coupled to the control unit 28. The operations of these units are controlled by the control unit 28.

The control unit 28 includes a CPU (central processing unit) 281 and a storage unit 282. The CPU 281 is able to run various programs stored in the storage unit 282. For example, the CPU 281 is able to perform various kinds of determination and give various kinds of instructions. For example, based on a detection result of a detection unit 54, the CPU 281 controls the operation of a feeder roller 32 as will be described later.

For example, various programs such as a program for manufacturing a sheet S, various kinds of calibration curve data, tables, and the like are stored in the storage unit 282.

The control unit 28 may be built in the fibrous body molding apparatus 100, or may be provided in an external device such as an external computer. The external device may, for example, communicate with the fibrous body molding apparatus 100 via a cable or the like or wirelessly. The external device may be connected to the fibrous body molding apparatus 100 via a network such as, for example, the Internet.

The CPU 281 and the storage unit 282 may be integrated into a single unit. The CPU 281 may be built in the fibrous body molding apparatus 100, and the storage unit 282 may be provided in an external device such as an external computer. The storage unit 282 may be built in the fibrous body molding apparatus 100, and the CPU 281 may be provided in an external device such as an external computer.

The control unit 28 may be a component of the small piece supplying apparatus 1 and may be not a component of the small piece supplying apparatus 1. In the following description, the control unit 28 is explained as a component of the small piece supplying apparatus 1.

Next, the small piece supplying apparatus 1 will now be explained in detail.

As illustrated in FIG. 2, the small piece supplying apparatus 1 includes the raw material supplying unit 3 that supplies the raw material sheet M1, the coarse crushing unit 4 that coarsely crushes the raw material sheet M1, the reservoir unit 5 that stores the coarse crushed pieces M2, and the weighing unit 6 that weighs the coarse crushed pieces M2.

The raw material supplying unit 3 includes a stock unit 31 in which a plurality of raw material sheets M1 is stored, a feeder roller 32 that feeds out the raw material sheet M1 stored in the stock unit 31, a contact unit 33 with which an edge of the raw material sheet M1 fed out by the feeder roller 32 comes into contact, and a guide member 34 that is an example of a guiding section and guides, toward the coarse crushing unit 4, the raw material sheet M1 after being transported along the contact unit 33. The raw material supplying unit 3 is a section that performs a raw material supplying process.

The stock unit 31 includes a container box 311 as a containing section, an elevation plate 312 as an elevating section, and an urging unit 313 as a first urging section.

The container box 311 is a box for containing the raw material sheets M1 inside. The container box 311 is a box that has a +z opening, namely, an opening oriented vertically upward. The raw material sheets M1 are stacked one on another in the +z direction inside the container box 311 such that they share the same thickness direction. The maximum number of the raw material sheets M1 that can be contained in the container box 311 is not specifically limited. The maximum number may be 10 or more and 10,000 or less. The maximum number may be 100 or more and 2,000 or less.

The elevation plate 312 is a plate on the top of which the raw material sheets M1 are to be stacked. The elevation plate 312 is provided inside the container box 311 such that its thickness direction is the same as the thickness direction of the raw material sheets M1. The urging unit 313 is provided under the lower surface of the elevation plate 312.

The urging unit 313 is provided between the elevation plate 312 and the bottom plate of the container box 311. The urging unit 313 urges the elevation plate 312 in the +z direction. For example, various kinds of spring members can be used as the urging unit 313. For example, if the number of the raw material sheets M1 is comparatively large as illustrated in FIG. 2, the urging unit 313 is in a compressed state due to the total weight of the raw material sheets M1. As the number of the raw material sheets M1 decreases due to feeding, the elevation plate 312 moves gradually in the +z direction from the illustrated state. This causes the +z directional movement of the raw material sheets M1 as a whole, thereby keeping the position of the top portion of the raw material sheets M1 in the +z direction constant. Therefore, the top sheet is pushed toward the feeder roller 32 at a constant pushing force. This ensures stable feeding by the feeder roller 32 in the +x direction regardless of a decrease/increase in the number of the raw material sheets M1.

In the illustrated structure, one urging unit 313 is provided at the center of the container box 311. However, the scope of the present disclosure is not limited to this example. A plurality of urging units 313 may be provided. The urging unit 313 may be a motor, etc. for driving the elevation plate 312 up and down.

The feeder roller 32 is provided over the container box 311. The feeder roller 32 is provided over the container box 311 at a position that is not the center and is closer to the contact unit 33, that is, at a +x directional non-center position. This enhances the reliability of feeding out the raw material sheet M1.

The feeder roller 32 has a shape of a round column or a cylinder and has a function of feeding out the raw material sheet M1 on a sheet-after-sheet basis by rotating around its central axis O32. The feeder roller 32 extends in the depth direction in FIG. 2, that is, in the direction orthogonal to the feeding direction. The central axis O32 is oriented in the depth direction in FIG. 2. The feeding direction, in which the feeder roller 32 feeds out the raw material sheet M1, is the horizontal direction. However, the scope of the present disclosure is not limited to this example. The feeder roller 32 may feed out the raw material sheet M1 in an inclined direction with respect to the horizontal direction. In FIG. 2, the arrow a indicates the transportation path of the raw material sheet M1.

The number and shape of the feeder roller 32 is not limited to a single columnar or cylindrical roller. For example, the feeder roller 32 may be made up of a plurality of divided roller segments provided along the central axis O32.

The feeder roller 32 is connected either directly or via a speed reducer to a motor 321 illustrated in FIGS. 2 and 3. Driven by the motor 321, the feeder roller 32 rotates around the central axis O32. The motor 321 is electrically coupled to the control unit 28 via a motor driver D1 as illustrated in FIG. 3 and operates by energization. The motor 321 may rotate in only one direction indicated by an arrow in FIG. 2, that is, in the counterclockwise direction only. The motor 321 may be configured to rotate also in a direction that is the opposite of the direction indicated by the arrow in FIG. 2, that is, also in the clockwise direction, by changing energization conditions. If the motor 321 is able to rotate in both directions, for example, it is possible to stop the feeding of the raw material sheet M1 and putting the raw material sheet M1 back to the original position by performing reverse rotation while the raw material sheet M1 is being fed out. The rotation speed of the motor 321 may be variable by changing energization conditions or may be always constant.

The surface of the feeder roller 32 may be treated for improving the frictional resistance with the raw material sheet M1. The improved frictional resistance prevents the idle rotation of the feeder roller 32 from occurring, thereby enhancing the reliability of feeding out the raw material sheet M1. The treatment is not specifically limited. For example, a high frictional resistance layer that can be made of various kinds of rubber, polymer elastomer, or the like may be provided on the surface. Surface roughening, embossing, or the like may be used.

The feeder roller 32 is connected to an urging unit 322 as a second urging section. The urging unit 322 urges the feeder roller 32 in the direction from +z toward −z. Due to the urging, the feeder roller 32 rotates in a state of being pushed to the raw material sheet M1. Therefore, the force of friction between the feeder roller 32 and the top one of the raw material sheets M1 is adjusted into a desired magnitude, thereby enhancing the reliability of feeding out the raw material sheet M1. Moreover, the raw material sheet M1 and the feeder roller 32 are pushed toward each other because the urging unit 313 mentioned earlier urges the raw material sheet M1 in the +z direction; therefore, it is possible to feed out the raw material sheet M1 more reliably and stably. The synergistic effect by the urging unit 313 as the first urging section and the urging unit 322 as the second urging section makes it possible to feed out the raw material sheet M1 more reliably and stably.

A plurality of feeder rollers may be provided as the feeder roller 32. In this case, it will be advantageous if the feeder rollers 32 are arranged next to each other in the +x direction over the container box 311 such that their central axes O32 are parallel to each other. All of the feeder rollers 32 may be connected to the motor 321. Not all of them necessarily have to be connected to the motor 321.

The contact unit 33 is a member that changes the course of the raw material sheet M1 by contact with the +x directional edge of the raw material sheet M1 fed out by the feeder roller 32, that is, the leading edge E1 in the feeding direction. The contact unit 33 is provided on the +x side with respect to the feeder roller 32. Namely, the contact unit 33 is provided downstream of the feeder roller 32 in the feeding direction in which the raw material sheet M1 is fed.

The contact unit 33 has a contact surface 331 that is an example of a sloped surface. The slope is inclined with respect to a first axis O1 that is along the feeding direction in which the raw material sheet M1 is fed. In the present embodiment, the contact surface 331 is a planar surface and is inclined in such a way as to slope upward downstream in the feeding direction in which the raw material sheet M1 is fed. In other words, the contact surface 331 is expressed by a linear function $x=kx$ (where k is a positive coefficient) when viewed in the y direction as illustrated in FIG. 4.

The contact unit 33 is fixed to the stock unit 31 by means of a supporting member 35. The contact unit 33 may be detachable. The contact unit 33 may be not detachable. When configured to be detachable, a plurality of contact units 33 may be prepared, and the selected one of them may be attached. In this case, it will be advantageous if the angles of inclination of the contact surfaces 331 of the plurality of contact units 33 are different from one another.

When the feeder roller 32 feeds out the raw material sheet M1, double feeding of two raw material sheets M1, one of which is on the other, sometimes happens as illustrated in FIG. 4. If this happens, as illustrated in FIG. 5, the edge portion of the raw material sheet M1 deforms when the downstream edge E1 or E2 in the feeding direction in which the raw material sheet M1 is fed comes into contact with the contact surface 331, and air enters the clearance between the two raw material sheets M1. The entry of air reduces the frictional resistance between the two raw material sheets M1 sufficiently. When the feeder roller 32 is further rotated in this state, as illustrated in FIG. 6, of the two raw material sheets M1, the one M1 that is directly in contact with the feeder roller 32 is fed out first with a change in course, and the two raw material sheets M1 are fed out in a state in which the edge E1 and E2 are out of alignment. The upper raw material sheet M1 and the lower raw material sheet M1 may be transported together in the out-of-alignment state, or may be transported sequentially, not together. In either case, transportation to the coarse crushing unit 4 in a state of alignment of the edge E1 and E2 is prevented. This stabilizes the production of the coarse crushed pieces M2 and reduces a burden on rotary blades 41.

As described above, when the raw material sheets M1 come into contact with the contact unit 33 and thus change the course, the two raw material sheets M1 the one of which is on the other are separated from each other and fed out. Therefore, it is possible to supply a constant amount of the raw material sheets M1 to the coarse crushing unit 4 stably. Therefore, it is possible to produce a constant amount of the coarse crushed pieces M2 stably. Consequently, it is possible to supply a constant amount of the coarse crushed pieces M2 to the defibrating unit 13 stably and therefore manufacture the sheets S stably and improve the quality of the sheets S.

The principle of separation of the two raw material sheets M1 described above is a mere example. The scope of the present disclosure is not limited to this example.

The present disclosure is advantageous in terms of the following point over a retard method of related art illustrated in FIGS. 7 to 9. In the retard method, two feeder rollers are provided on respective sides in the thickness direction, that is, the z direction, and a sheet is transported while being nipped between the two feeder rollers. Moreover, in the retard method, raw material sheets M1 that are fed such that one sheet is on the other sheet are separated and fed out by adjusting the rotation direction and the rotation speed of each rotation roller.

If the raw material sheet M1 is waste paper that has been used, as in the present embodiment, for example, the raw material sheets M1 one of which is on the other are sometimes bound with a staple 200. For example, the following phenomenon occurs when a downstream corner in the feeding direction is bound with a staple 200 as illustrated in FIG. 7. When an upper feeder roller and a lower feeder roller constituting a pair 300 are rotated from a state illustrated in FIG. 7 in the same direction, that is, rotated in the counterclockwise direction respectively, the raw material sheets M1 and the staple 200 get caught in the gap between the feeder rollers 300, resulting in a paper jam. The paper jam might cause deformation of, and/or damage to, the raw material sheets M1. As a result, the operation of the feeder rollers 300 might stop.

By contrast, in the present disclosure, when a downstream corner in the feeding direction is bound with a staple 200 as illustrated in FIG. 10, and further if the feeder roller 32 is operated, the raw material sheets M1 change the direction together with the staple 200 at the contact unit 33 as illustrated in FIG. 11, and are transported while keeping the stapled state.

As explained above, in the present disclosure, when a downstream corner in the feeding direction is bound with a staple 200, a paper jam does not occur and the operation of the feeder roller 32 does not stop although sheet separation is impossible. Therefore, the present disclosure makes it possible to supply the coarse crushed pieces M2 more stably than a retard method of related art.

Even if upstream edges E1 and E2 are bound with each other with a staple 200, it is less likely that a paper jam will occur in the present disclosure, whereas it is more likely that a paper jam will occur in related art. If the raw material sheet M1 is waste paper, there is a possibility that the raw material sheet M1 is bent. A retard method of related art is more susceptible to a paper jam because the bent portion or a neighborhood of the bent portion gets caught in the gap between the feeder rollers 300 similarly, although it is not illustrated. By contrast, the present disclosure enables the raw material sheets M1 to be fed out stably while being kept bent.

The contact unit 33 has a contact surface 331 that is an example of a sloped surface inclined with respect to the feeding direction in which the raw material sheet M1 is fed by the feeder roller 32. Because of this structure, the raw material sheet M1 fed out comes into contact with the contact surface 331 more reliably. Therefore, separation is performed more reliably as described above.

The contact surface 331 that is an example of a sloped surface is a planar surface. Because of this structure, the angle of inclination is the same no matter which portion of the contact surface 331 the raw material sheet M1 comes into contact with. Therefore, separation is performed stably. The contact surface 331 may be a curved surface.

To increase resistance with the raw material sheet M1, the contact surface 331 may have surface irregularities. The irregularities may extend in a direction along the transportation direction of the raw material sheet M1.

As illustrated in FIG. 4, an angle θ formed by the feeding direction in which the raw material sheet M1 is fed by the feeder roller 32 and the contact surface 331 that is an example of a sloped surface may be 20° or more and 70° or less. The angle θ may be 40° or more and 60° or less. This makes it possible to perform separation more reliably and stably.

The angle θ of the contact surface 331 may be adjusted by, for example, adjusting the angle of the supporting member 35.

The raw material sheet M1 after a change in course by the contact unit 33 is guided toward the coarse crushing unit 4 with another change in course by the guide member 34. The guide member 34 is provided on an extension of the course of the raw material sheet M1 changed by the contact unit 33. This enhances the reliability of contact with, and guiding of, the raw material sheet M1 after being transported along the contact unit 33.

The guide member 34 has a curved surface 341 serving as a guiding surface. Therefore, the raw material sheet M1 is guided smoothly. Due to the guiding, the raw material sheet M1 after a change in course is directed toward the coarse crushing unit 4 with another change in course. As will be described later, since the direction in which the raw material sheet M1 is supplied to the coarse crushing unit 4 is different from the direction into which the course is changed by the contact unit 33, it is effective to provide the guide member 34 having the above structure.

As explained above, the small piece supplying apparatus 1 includes the guide member 34 that is an example of a guiding section and guides, toward the coarse crushing unit 4, the raw material sheet M1 after a change in course by the contact unit 33. This makes it possible to direct, toward the coarse crushing unit 4, the raw material sheet M1 after being transported along the contact unit 33 more reliably. Therefore, it is possible to supply the coarse crushed pieces M2 more stably.

The coarse crushing unit 4 is a section that performs a coarse crushing process of coarsely crushing the raw material sheet M1 supplied from the raw material supplying unit 3 in air such as atmospheric conditions. The coarse crushing unit 4 includes a pair of rotary blades 41 and a motor 42. The motor 42 drives each of the rotary blades 41 for rotation. Each of the rotary blades 41 is connected either directly or via a non-illustrated speed reducer to the motor 42.

By rotating around respective central axes O41 in respective directions that are the opposite of each other, the pair of rotary blades 41 is able to coarsely crush, that is, shred, the raw material sheet M1 therebetween into the coarse crushed pieces M2. It will be advantageous if the coarse crushed piece M2 has a shape and size suitable for defibration by the defibrating unit 13. For example, the length of a side of the small piece may be 100 mm or less. The length of a side of the small piece may be 10 mm or more and 70 mm or less.

The central axes O41 of the rotary blades 41 are parallel to each other. Each of the central axes O41 is parallel to the central axis O32 of the feeder roller 32. The rotary blades 41 are provided next to each other in parallel with the course of the raw material sheet M1 changed by the contact unit 33. The direction in which the raw material sheet M1 is inserted into the coarse crushing unit 4 is different from the direction into which the course is changed by the contact unit 33. In other words, the direction in which the transportation path of the raw material sheet M1 is oriented at the rotary blades 41 is different from the direction into which the course is changed by the contact unit 33.

Specifically, the direction in which the raw material sheet M1 immediately after the contact with the contact surface 331 goes is a direction that has a vector component in the +x direction and in the +z direction. The direction in which the raw material sheet M1 is inserted between the pair of rotary blades 41 of the coarse crushing unit 4 after being guided by the guide member 34 is a direction that has a vector component in the +x direction and in the −z direction. Therefore, the produced coarse crushed pieces M2 fall downward by their own weight.

As described above, the coarse crushing unit 4 includes the pair of rotary blades 41, and the direction in which the raw material sheet M1 is inserted between the pair of rotary blades 41 is different from the direction into which the course is changed by the contact unit 33. Therefore, the coarse crushed pieces M2 fall into, and are thus supplied to, the reservoir unit 5. This makes it easier to send the coarse crushed pieces M2 into the reservoir unit 5.

The motor 42 is electrically coupled to the control unit 28 via a motor driver D2 and operates by energization to cause each of the rotary blades 41 to rotate. In the present embodiment, the motor 42 is a single motor and is shared by the rotary blades 41. However, the scope of the present disclosure is not limited to this example. For example, two motors 42 may be provided and connected to the rotary blades 41 respectively.

The coarse crushed pieces M2 produced by the coarse crushing unit 4 in this way fall into, and are thus supplied to, the reservoir unit 5. As illustrated in FIG. 2, the reservoir unit 5 is a section in which the coarse crushed pieces M2 produced by the coarse crushing unit 4 are temporarily accumulated before being supplied to the defibrating unit 13.

The reservoir unit 5 includes a reservoir tank 51, a rotating body 52, a discharge port 53, a detection unit 54, and a foreign object catcher 55. The reservoir unit 5 has a function of supplying a constant amount of the coarse crushed pieces M2 to the defibrating unit 13 stably by temporarily accumulating and discharging the coarse crushed pieces M2. Because of the synergy of the advantage offered by the reservoir unit 5 and the advantage offered by the contact unit 33 described earlier, it is possible to produce and supply a constant amount of the coarse crushed pieces M2 stably.

The reservoir tank 51 is installed at a position at the −z side with respect to the coarse crushing unit 4 to overlap with the coarse crushing unit 4 when viewed from the +z side. The reservoir tank 51 is a container with a bottom and a +z opening. The coarse crushed pieces M2 produced by the coarse crushing unit 4 are temporarily accumulated in the reservoir tank 51.

The rotating body 52 is provided at the center on the inner wall of the bottom of the reservoir tank 51. The rotating body 52 has a plurality of blades 521 arranged radially. By rotation, the rotating body 52 is able to stir the coarse crushed pieces M2 inside the reservoir tank 51 while disentangling them and guide them to the discharge port 53.

The rotating body 52 is connected either directly or via a non-illustrated speed reducer to a motor 522 illustrated in FIGS. 2 and 3. The motor 522 is electrically coupled to the control unit 28 via a motor driver D3. The operation of the motor 522 is controlled by the control unit 28. The motor 522 may rotate in only one direction indicated by an arrow in FIG. 2. The motor 522 may be configured to rotate also in a direction that is the opposite of the direction indicated by the arrow in FIG. 2 by changing energization conditions. The rotation speed of the motor 522 may be variable by changing energization conditions or may be always constant.

The discharge port 53 is a cylindrical member that has a function of discharging the coarse crushed pieces M2 contained inside the reservoir tank 51. The discharge port 53 protrudes outward from a side of the reservoir tank 51. The discharge port 53 is provided at a position that is not the center and is closer to the bottom of the reservoir tank 51. The inside of the discharge port 53 is in communication with the inside of the reservoir tank 51. The coarse crushed pieces M2 moving while being stirred by the rotating body 52 are discharged from the discharge port 53 to fall into the weighing unit 6.

The discharge port 53 may be provided at the bottom of the reservoir tank 51. A shutter for switching between allowing and not allowing the coarse crushed pieces M2 to pass may be provided in the discharge port 53.

The detection unit 54 has a function of detecting the amount of the coarse crushed pieces M2 contained inside the reservoir unit 5. The detection unit 54 is a transmissive-type optical sensor that includes a light emitting unit 541 and a light receiving unit 542. The light receiving unit 542 receives light L emitted by the light emitting unit 541. The light emitting unit 541 and the light receiving unit 542 are provided inside the reservoir unit 5 at a +z directional non-center position. Each of the light emitting unit 541 and the light receiving unit 542 is electrically coupled to the control unit 28.

When the light receiving unit 542 receives the light L, information about receiving the light or about the amount of the light received is outputted as a signal by photoelectric conversion to be processed by the control unit 28. For example, the control unit 28 determines that the amount of the coarse crushed pieces M2 accumulated has reached the position of the light emitting unit 541 and the light receiving unit 542 if the amount of the light received by the light receiving unit 542 is less than a predetermined value stored in the storage unit 282 for a predetermined length of time. A more detailed explanation of this will be given later.

The detection unit 54 is not limited to a transmissive-type optical sensor. The detection unit 54 may be a reflective-type optical sensor. The detection unit 54 is not limited to an optical sensor. For example, the total weight of the coarse crushed pieces M2 contained inside the reservoir unit 5 may be measured. Plural pairs, each of which is a pair of the light emitting unit 541 and the light receiving unit 542, may be provided.

The foreign object catcher 55 has a function of catching a foreign object that is mixed in the coarse crushed pieces M2 and is attracted by a magnet, for example, catching a staple 200 made of metal. The foreign object catcher 55 is provided at the bottom of the reservoir tank 51 in the neighborhood of the discharge port 53. For example, it is possible to use a permanent magnet as the foreign object catcher 55. The permanent magnet is not specifically limited. For example, an alloy magnet, a ferrite magnet, a rare earth magnet, or the like can be used. The alloy magnet is not specifically limited. Examples of the alloy magnet include a Fe—Al—Ni—Co magnet (iron-aluminum-nickel-cobalt magnet: Alnico magnet), a Fe—Cr—Co magnet (iron-chromium-cobalt magnet), and the like. The ferrite magnet is not specifically limited. An example of the ferrite magnet includes hard ferrite (ceramic magnet), and the like. The rare earth magnet is not specifically limited. Examples of the rare earth magnet include a Sm—Co magnet (samarium-cobalt magnet), a ND-Fe—B magnet (neodymium-iron-boron magnet: neodymium magnet), and the like. The foreign object catcher 55 may be in any form such as a bonded magnet, a sintered magnet, a powder compact magnet, and the like.

The shape of the permanent magnet may be any shape such as a bar shape, a plate shape, a ring shape, and the like. The number of permanent magnets provided is also not specifically limited. The magnetic flux density of the permanent magnet is not specifically limited. For example, the magnetic flux density of the permanent magnet may be 8,000 G or more and 15,000 G or less, and may be 10,000 G or more and 13,000 G or less.

As explained above, the reservoir unit 5 includes the foreign object catcher 55 that catches, by using magnetic attraction, a foreign object that is mixed in the coarse crushed pieces M2 as an example of small pieces. This makes it possible to prevent or reduce the risk of a foreign object that has specific gravity different from that of the coarse crushed pieces M2 from being put out to the weighing unit 6, thereby ensuring a reliable constant amount. Moreover, this makes it possible to prevent or reduce the risk of supply of a fragment of metal or the like to the defibrating unit 13 located downstream and thus prevent or reduce the risk of damage to the rotary blades of the defibrating unit 13 and prevent or reduce the risk of a decrease in the quality of the sheet S due to the mixing of the foreign object therein.

The weighing unit 6 includes a bottomed cylindrical container 61 that is a receiver, a load cell 62 that is a weight measurement section provided on the bottom side of the container 61, and a rotation driver 63. The container 41 temporarily stores the crushing piece M2 discharged from the discharge port 312. The container 61 temporarily contains the coarse crushed pieces M2 discharged from the discharge port 53. The weighing unit 6 is a section that performs a weighing process.

The load cell 62 has a function of detecting an external force, converting the detection result into an electric signal, and outputting the electric signal. The load cell 62 is installed in such a way as to support the container 61 from the bottom side. This makes it possible to detect the weight of the coarse crushed pieces M2 contained inside the container 61.

The load cell 62 is electrically coupled to the control unit 28 illustrated in FIG. 1. The detection result of the load cell 62 is transmitted to the control unit 28. The type of the load cell 62 is not specifically limited, and may be a magnetostrictive load cell, a capacitance load cell, a gyro-load cell, a strain gauge load cell, or the like.

As illustrated in FIG. 2, the container 61 is connected to the rotation driver 63. The rotation driver 63 is electrically coupled to the control unit 28 via a motor driver D4. The operation of the rotation driver 63 is controlled by the control unit 28. Driven by the rotation driver 63, the container 61 is able to change its orientation by rotating from a state in which its opening is oriented upward as shown by solid-line illustration in FIG. 2 to a state in which its opening is oriented downward as shown by two-dot-chain-line illustration in FIG. 2. Turning upside down causes the coarse crushed pieces M2 accumulated inside the container 61 to fall downward to be supplied to a chute 122. The mechanism for causing the coarse crushed pieces M2 accumulated inside the container 61 to fall downward is not limited to the above example. For example, the container 61 may have an opening formed in its bottom and a shutter that opens and closes the opening, and the opening and closing of the opening formed in the bottom of the container may be controlled.

When the weight of the coarse crushed pieces M2 detected by the load cell 62 reaches a predetermined weight, the container 61 turns to cause a predetermined amount of the coarse crushed pieces M2 to fall into the chute 122 and to be supplied to the defibrating unit 13. As explained above, the small piece supplying apparatus 1 includes the weighing unit 6 that measures a weight of the coarse crushed pieces M2 as an example of small pieces discharged from the discharge port 53 of the reservoir unit 5. This makes it possible to supply a constant amount of the coarse crushed pieces M2 to the defibrating unit 13 stably. Therefore, it is possible to manufacture the sheet S stably and improve the quality of the sheet S.

The chute 122 is provided under the weighing unit 6 and has a shape like, for example, a funnel. Therefore, it is possible to receive the coarse crushed pieces M2 falling from the weighing unit 6.

A humidifying unit 231 is provided over the chute 122. The humidifying unit 231 humidifies the coarse crushed pieces M2 in the chute 122. The humidifying unit 231 includes a non-illustrated filter containing moisture. The humidifying unit 231 is a warm-air-vaporization-type humidifier that supplies humidified air with increased humidity to the coarse crushed pieces M2 by passing air through the filter. Supplying humidified air to the coarse crushed pieces M2 makes it possible to prevent the static cling of the coarse crushed pieces M2 to the chute 122 and the like.

The chute 122 is connected to the defibrating unit 13 via the pipe 241. The coarse crushed pieces M2 gathered into the chute 122 are transported to the defibrating unit 13 through the pipe 241.

As explained above, the small piece supplying apparatus 1 includes the raw material supplying unit 3 that supplies the raw material sheet M1; the coarse crushing unit 4 that coarsely crushes the raw material sheet M1 supplied from the raw material supplying unit 3 to produce the coarse crushed pieces M2 as an example of small pieces; and the reservoir unit 5 in which the coarse crushed pieces M2 produced by the coarse crushing unit 4 are accumulated. The raw material supplying unit 3 includes the feeder roller 32 that feeds out the raw material sheet M1, and the contact unit 33 that changes a course of the raw material sheet M1 by contact with an edge of the raw material sheet M1 fed out by the feeder roller 32. Therefore, when the raw material sheets M1 come into contact with the contact unit 33 and thus change the course, the raw material sheets M1 the one of which is on the other are separated from each other and fed out separately. Therefore, it is possible to supply a constant amount of the raw material sheets M1 to the coarse crushing unit 4 stably. Consequently, it is possible to produce and supply a constant amount of the coarse crushed pieces M2 stably.

The fibrous body molding apparatus 100 includes: the small piece supplying apparatus 1; the defibrating unit 13 that defibrates the coarse crushed pieces M2 as an example of the small pieces supplied by the small piece supplying apparatus 1; the second web forming unit 19 as an example of a deposition section on which the defibrated material M3 produced by the defibrating unit 13 is deposited; and the molding unit 20 that molds the second web M8 as an example of a deposited material produced on the second web forming unit 19. By this means, it is possible to manufacture the sheet S stably and improve the quality of the sheet S while enjoying the benefits of the small piece supplying apparatus 1 described above.

Next, based on the flowchart illustrated in FIG. 13, the control operation of the control unit 28 will now be explained.

In a step S101, each unit of the fibrous body molding apparatus 100 is activated to start sheet manufacturing. That is, the supply of the raw material sheets M1 is started.

Next, in a step S102, it is determined whether or not the amount of the coarse crushed pieces M2 contained inside the reservoir unit 5 illustrated in FIG. 2 has exceeded a predetermined amount for a predetermined length of time or longer. That is, it is determined whether or not a state of exceeding the predetermined amount has continued for the predetermined length of time or longer. This determination is performed based on a time threshold and an amount threshold that have been stored in the storage unit 282 in advance.

If it is determined in the step S102 that the amount of the coarse crushed pieces M2 contained inside the reservoir unit 5 has exceeded the predetermined amount for the predetermined length of time or longer, the supply of the raw material sheets M1 is stopped in a step S103. That is, the operation of the feeder roller 32 illustrated in FIG. 2 is stopped. This stops the supply of the coarse crushed pieces M2 to the reservoir unit 5 although the discharging of the coarse crushed pieces M2 from the discharge port 53 continues. Therefore, it is possible to prevent the amount of the coarse crushed pieces M2 contained inside the reservoir unit 5 from increasing excessively. Even if the coarse crushed pieces M2 that are falling block the light L momentarily, performing the above control prevents wrong detection that the amount of the coarse crushed pieces M2 contained inside the reservoir unit 5 has exceeded the predetermined amount.

If it is determined in the step S102 that the amount of the coarse crushed pieces M2 contained inside the reservoir unit 5 has not exceeded the predetermined amount for the predetermined length of time or longer, the process proceeds to a step S106.

In a step S104, it is determined whether or not the amount of the coarse crushed pieces M2 contained inside the reservoir unit 5 has been smaller than a predetermined amount for a predetermined length of time or longer. If it is determined that the amount of the coarse crushed pieces M2 contained inside the reservoir unit 5 has been smaller than the predetermined amount for the predetermined length of time or longer, the supply of the raw material sheets M1 is restarted in a step S105. That is, the operation of the feeder roller 32 illustrated in FIG. 2 is restarted.

Then, in a step S106, it is determined whether or not the sheet manufacturing has completed. This determination is performed based on, for example, whether or not a stop instruction has been given by a user, whether or not a set number of the sheets S have been manufactured, or whether or not a set number of the raw material sheets M1 have been supplied.

If it is determined in the step S106 that the sheet manufacturing has not completed yet, the process returns to the step S102, and the subsequent steps are repeated sequentially.

As explained above, the small piece supplying apparatus 1 includes the detection unit 54 includes the detection unit 54 that detects the amount of the coarse crushed pieces M2 as an example of the small pieces contained inside the reservoir unit; and the control unit 28 that controls operation of the feeder roller 32 based on a detection result of the detection unit 54. By this means, it is possible to adjust the amount of supply of the raw material sheets M1 depending on the amount of the coarse crushed pieces M2 contained inside the reservoir unit 5. Therefore, it is possible to produce and supply a constant amount of the coarse crushed pieces M2 more stably.

The control unit 28 stops the operation of the feeder roller 32 if the amount of the coarse crushed pieces M2 as an example of the small pieces contained inside the reservoir unit 5 has exceeded the predetermined amount. By this means, it is possible to prevent the amount of the coarse crushed pieces M2 contained inside the reservoir unit 5 from increasing excessively. This prevents or reduces the risk of, for example, the discharge port 53 from getting clogged with the coarse crushed pieces M2. Therefore, it is possible to produce and supply a constant amount of the coarse crushed pieces M2 more stably.

In the present embodiment, it is explained that the supply of the raw material sheets M1 is stopped, that is, the operation of the feeder roller 32 is stopped, for the purpose of adjusting the amount of the coarse crushed pieces M2 contained inside the reservoir unit 5. However, the scope of the present disclosure is not limited to this example. For example, the rotation speed of the feeder roller 32 may be decreased, or the rotation speed of the rotating body 52 of the reservoir unit 5 may be increased.

Although a small piece supplying apparatus and a fibrous body molding apparatus according to the illustrated embodiment has been described above, the scope of the present disclosure is not limited to the foregoing examples. The units constituting the small piece supplying apparatus and the fibrous body molding apparatus may be replaced with arbitrary alternatives that fulfill the same functions. Arbitrary components may be added.

What is claimed is:

1. A small piece supplying apparatus, comprising:
   a raw material supplying section that supplies a raw material sheet;
   a coarse crushing section that coarsely crushes the raw material sheet supplied from the raw material supplying section to produce small pieces; and
   a reservoir section in which the small pieces produced by the coarse crushing section are accumulated; wherein
   the raw material supplying section includes
      a feeder roller that feeds out the raw material sheet, and
      a contact section that changes a course of the raw material sheet by contact with an edge of the raw material sheet fed out by the feeder roller.

2. The small piece supplying apparatus according to claim 1, wherein
   the contact section has a sloped surface inclined with respect to a feeding direction in which the raw material sheet is fed by the feeder roller.

3. The small piece supplying apparatus according to claim 2, wherein
   the sloped surface is a planar surface.

4. The small piece supplying apparatus according to claim 3, wherein
   an angle formed by the feeding direction in which the raw material sheet is fed by the feeder roller and the sloped surface is 20° or more and 70° or less.

5. The small piece supplying apparatus according to claim 1, wherein
   the coarse crushing section includes a pair of rotary blades, and
   a direction in which the raw material sheet is inserted between the pair of rotary blades is different from a direction into which a course of the raw material sheet is changed by the contact section.

6. The small piece supplying apparatus according to claim 5, further comprising:
   a guiding section that guides, toward the coarse crushing section, the raw material sheet after a change in the course by the contact section.

7. The small piece supplying apparatus according to claim 1, further comprising:
   a weighing section that that measures a weight of the small pieces discharged from the reservoir section.

8. The small piece supplying apparatus according to claim 1, further comprising:

a detecting section that detects an amount of the small pieces inside the reservoir section; and a control section that controls operation of the feeder roller based on a detection result of the detecting section.

9. The small piece supplying apparatus according to claim 8, wherein the control section stops the operation of the feeder roller when the amount of the small pieces inside the reservoir section exceeds a predetermined amount.

10. The small piece supplying apparatus according to claim 1, wherein the reservoir section includes a foreign object catcher that catches, by using a magnetic force, a foreign object mixed in the small pieces.

11. A fibrous body molding apparatus, comprising:

the small piece supplying apparatus according to claim 1;

a defibrating section that defibrates the small pieces supplied by the small piece supplying apparatus;

a deposition section on which a defibrated material produced by the defibrating section is deposited; and a molding section that molds a deposited material produced on the deposition section.

\* \* \* \* \*